United States Patent
Bravard (10) Patent No.: US 11,169,032 B2
(45) Date of Patent: Nov. 9, 2021

(54) GAUGE WITH ADAPTIVE CALIBRATION AND METHOD

(71) Applicant: SERCEL, Carquefou (FR)

(72) Inventor: Nicolas Bravard, Toulouse (FR)

(73) Assignee: SERCEL, Carquefou (FR)

(*) Notice: Subject to any disclaimer, the term of this patent is extended or adjusted under 35 U.S.C. 154(b) by 610 days.

(21) Appl. No.: 15/481,713

(22) Filed: Apr. 7, 2017

(65) Prior Publication Data
US 2018/0291732 A1    Oct. 11, 2018

(51) Int. Cl.
*G01L 27/00* (2006.01)
*G01K 1/022* (2021.01)
*G01V 13/00* (2006.01)

(52) U.S. Cl.
CPC ............ *G01K 1/022* (2013.01); *G01L 27/002* (2013.01); *G01V 13/00* (2013.01)

(58) Field of Classification Search
CPC ........ E21B 47/12; E21B 47/124; E21B 47/06; E21B 44/005; G01K 1/22; G01L 19/086
See application file for complete search history.

(56) References Cited

U.S. PATENT DOCUMENTS

| | | | | |
|---|---|---|---|---|
| 2,053,967 A * | 9/1936 | Young | ............... | E21B 47/06 374/136 |
| 3,181,063 A * | 4/1965 | Ullrich | ............... | G01R 13/04 324/130 |
| 3,440,533 A * | 4/1969 | Earley | ............... | G01R 1/28 324/74 |
| 3,720,813 A * | 3/1973 | Badessa | ............... | G01R 17/00 250/565 |
| 3,740,533 A * | 6/1973 | van Zeggelaar | ............... | E02F 7/04 700/71 |
| 4,663,628 A * | 5/1987 | Duncan | ............... | E21B 47/124 340/853.9 |

(Continued)

FOREIGN PATENT DOCUMENTS

WO    2014011966 A1    1/2014

OTHER PUBLICATIONS

Partial European Search Report in European Application No. EP 18 16 2458 dated Dec. 5, 2018.

*Primary Examiner* — David J Bolduc
(74) *Attorney, Agent, or Firm* — Patent Portfolio Builders PLLC (57) ABSTRACT

Memory gauge and method for processing recorded raw data acquired with a memory gauge in a well. The method includes selecting a first calibration table ($C_1$), of the memory gauge, that has a highest calibration value for the measured parameter; performing a first analysis of the recorded raw data using the first calibration table ($C_1$) to determine a highest measured value of the measured parameter; comparing the highest measured value of the measured parameter with highest calibration values of the plural calibration tables of the memory gauge; and when a highest calibration value of a second calibration table is closer to the highest measured value of the measured parameter than the highest calibration value of the first calibration table, selecting the second calibration table ($C_2$); and performing a second analysis of the recorded raw data using the second calibration table ($C_2$) to generate measured values of the measured parameter.

14 Claims, 9 Drawing Sheets

(56) References Cited

U.S. PATENT DOCUMENTS

| | | | | |
|---|---|---|---|---|
| 4,665,398 A * | 5/1987 | Lynch | E21B 47/12 | 340/853.9 |
| 4,689,744 A * | 8/1987 | Zeller | E21B 47/06 | 367/25 |
| 4,709,234 A * | 11/1987 | Forehand | E21B 47/00 | 166/66 |
| 4,718,011 A * | 1/1988 | Patterson, Jr. | G01V 11/002 | 340/853.9 |
| 4,866,607 A * | 9/1989 | Anderson | E21B 47/00 | 702/11 |
| 5,180,973 A * | 1/1993 | Hoogendijk | G01R 35/002 | 324/121 R |
| 5,343,963 A * | 9/1994 | Bouldin | E21B 23/00 | 166/65.1 |
| 5,710,370 A * | 1/1998 | Shanahan | G01F 1/50 | 73/1.35 |
| 6,234,008 B1 | 5/2001 | Sjoblom et al. | | |
| 6,272,434 B1 * | 8/2001 | Wisler | E21B 7/068 | 702/11 |
| 6,932,154 B2 * | 8/2005 | Zillinger | E21B 47/01 | 166/250.11 |
| 2002/0078732 A1 * | 6/2002 | Bentley | G01D 18/008 | 73/1.88 |
| 2002/0171560 A1 * | 11/2002 | Ciglenec | E21B 7/061 | 340/853.1 |
| 2002/0195247 A1 * | 12/2002 | Ciglenec | E21B 7/06 | 166/250.11 |
| 2004/0122301 A1 * | 6/2004 | Kiani | A61B 5/14535 | 600/336 |
| 2004/0249592 A1 * | 12/2004 | Koukol, Jr. | G01F 25/00 | 702/88 |
| 2004/0253734 A1 * | 12/2004 | Firmin | E21B 47/06 | 436/28 |
| 2005/0117034 A1 * | 6/2005 | Cutler | G06T 5/009 | 348/239 |
| 2005/0257611 A1 | 11/2005 | Fogal et al. | | |
| 2007/0032957 A1 * | 2/2007 | Popilian | E21B 47/06 | 702/14 |
| 2009/0141771 A1 * | 6/2009 | Owen | G01K 1/14 | 374/178 |
| 2011/0128003 A1 * | 6/2011 | Thompson | E21B 47/06 | 324/337 |
| 2011/0267065 A1 * | 11/2011 | Bloys | E21B 47/06 | 324/337 |
| 2012/0037422 A1 * | 2/2012 | Rasheed | E21B 10/32 | 175/50 |
| 2012/0265468 A1 * | 10/2012 | Dennis | E21B 47/00 | 702/85 |
| 2013/0037260 A1 * | 2/2013 | Reed | E21B 47/12 | 166/244.1 |
| 2014/0019052 A1 * | 1/2014 | Zaeper | G01V 11/002 | 702/8 |
| 2014/0077964 A1 * | 3/2014 | Beligere | E21B 47/00 | 340/853.3 |
| 2014/0265619 A1 * | 9/2014 | Chau | H02J 17/00 | 307/104 |
| 2015/0148919 A1 * | 5/2015 | Watson | G06N 7/005 | 700/31 |
| 2015/0218929 A1 * | 8/2015 | Narasimhan | E21B 45/00 | 175/45 |
| 2015/0268117 A1 * | 9/2015 | Challener | G01D 5/35312 | 356/33 |
| 2015/0345283 A1 * | 12/2015 | Switzer | E21B 47/024 | 73/152.54 |
| 2016/0076918 A1 * | 3/2016 | Roider | G01D 5/35341 | 250/227.16 |
| 2016/0108720 A1 * | 4/2016 | Teowee | E21B 47/06 | 73/1.15 |
| 2016/0123137 A1 * | 5/2016 | Liu | E21B 7/04 | 175/41 |
| 2016/0168978 A1 * | 6/2016 | Kozak | E21B 47/04 | 73/152.44 |
| 2016/0245049 A1 * | 8/2016 | Mogensen | E21B 43/25 | |
| 2016/0327684 A1 * | 11/2016 | Chen | E21B 47/102 | |
| 2017/0101863 A1 * | 4/2017 | Coste | F04D 13/10 | |
| 2017/0226813 A1 * | 8/2017 | Northam | E21B 21/08 | |
| 2017/0241255 A1 * | 8/2017 | Switzer | E21B 47/024 | |
| 2017/0268323 A1 * | 9/2017 | Dykstra | G05B 19/048 | |
| 2017/0285221 A1 * | 10/2017 | Kayode | E21B 47/06 | |
| 2017/0328151 A1 * | 11/2017 | Dillard | E21B 21/08 | |
| 2018/0066513 A1 * | 3/2018 | Sugiura | E21B 7/04 | |
| 2018/0080310 A1 * | 3/2018 | Sorenson | G01C 21/08 | |

* cited by examiner

GAUGE WITH ADAPTIVE CALIBRATION AND METHOD

BACKGROUND

Technical Field

Embodiments of the subject matter disclosed herein generally relate to an apparatus and method for calibrating a gauge under various conditions, storing corresponding calibration matrices in a memory associated with the gauge and optimizing a precision of the gauge depending on the actual conditions under which the gauge has made the readings.

Discussion of the Background

A memory gauge is a device used to collect various data in downhole environments, such as, for example, inside of wells used for oil and gas extraction. A memory gauge may contain sensors, such as, for example, geophones, temperature sensors, pressure sensors, accelerometers, optical sensors, etc. Advantageously, a memory is directly associated with the gauge so that the data from the sensors are stored in the gauge, without need to transmit in real time. In order to function properly, a memory gauge that has been lowered into a well need to be calibrated prior to measuring a parameter inside the well.

For example, it is customary and useful to check different parameters during the completion and the production of an oil well. One of the most common mean to achieve this monitoring is to deploy a downhole memory gauge at the level of the reservoir (a few miles under the ground) to record one or more parameters associated with the well, like pressure and/or temperature.

Figure 1:
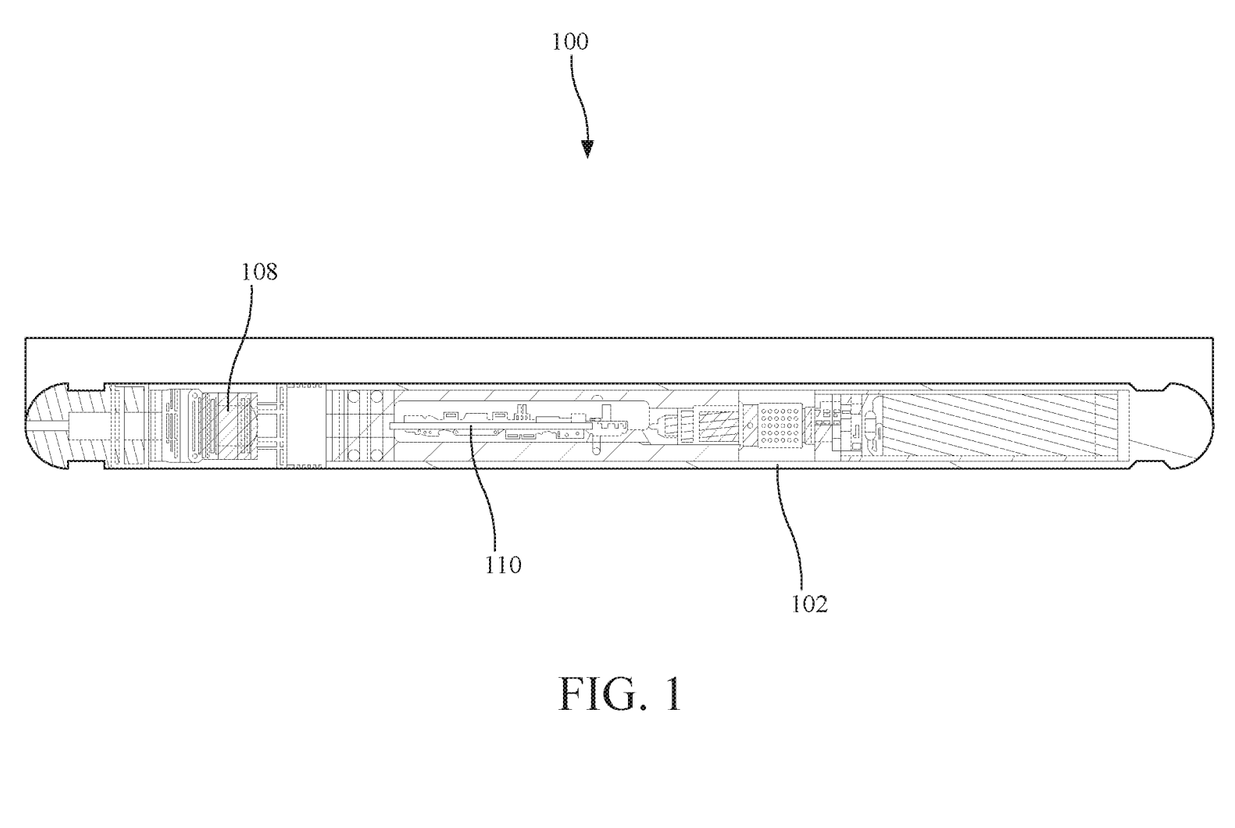
FIG. 1 depicts an exemplary memory gauge downhole tool.

FIG. 1 depicts an exemplary downhole tool 100, which in this case is a memory gauge. A memory gauge has at least one sensor that records an associated parameter and a memory that stores that parameter. The memory gauge is configured to record that parameter over a period of time, which results in a set of measured values that are all stored in the memory. In this case, the memory is also located on the gauge. More specifically, memory gauge 100 may include a main housing 102 of any suitable shape and made of any suitable material for enclosing any equipment, such as, for example, sensors 108 (for temperature, pressure, etc.), a memory 110 connected to the sensors and other mechanical, electric, and electronic components.

A pressure and temperature memory gauge (Quartz or Piezo version) 100 embeds for instance a pressure sensor 108, which is calibrated to measure accurately the pressure. This measurement is then recorded in the memory 110 of the memory gauge, depending on the programming of the memory gauge.

Figure 2:
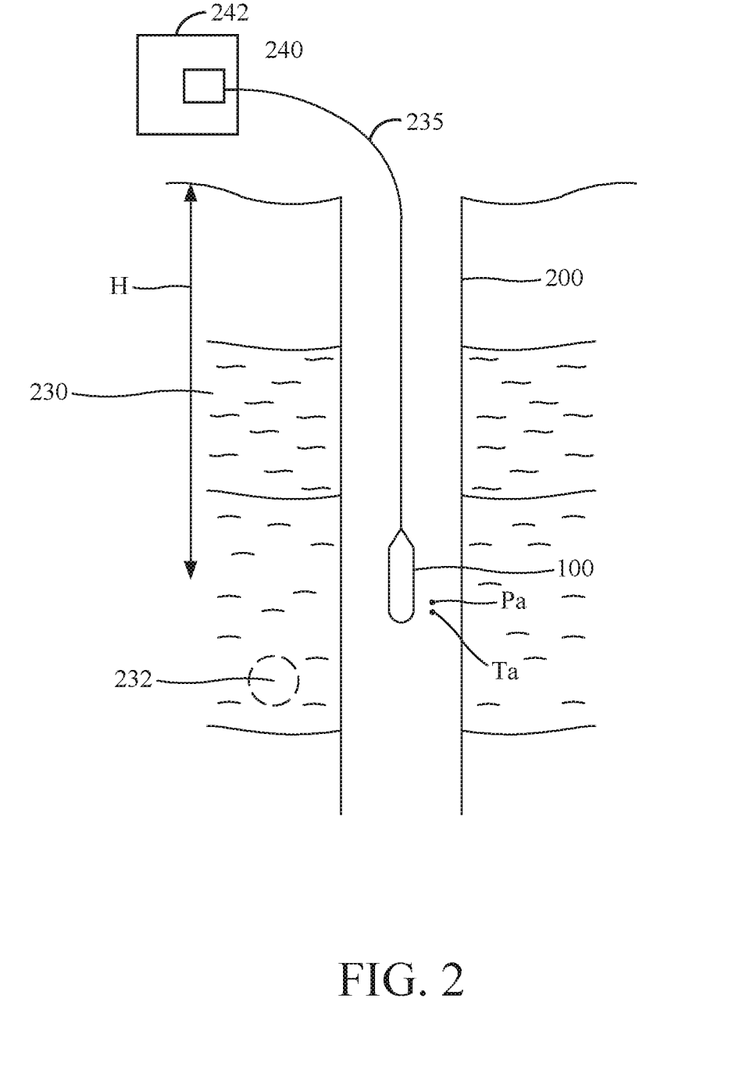
FIG. 2 illustrates a memory gauge located in a well.

The drawback of these gauges is that sometimes the memory gauge 100, when deployed in a well 200, as illustrated in FIG. 2, measures a maximum ambient pressure Pa or temperature Ta or any other parameter, which is much lower than the maximum value for which the memory gauge has been calibrated. This results in an accuracy of the gauge that is commensurate with the calibrated value and not with the measured value, i.e., it is lower than the percentage of the full scale that the memory gauge can measure. This problem is present in the existing memory gauges because it is not known a priori the maximum value that the memory gauge will measure in the well 200, as the various parameters that are measured in the well depend with the depth H of the well 200, the subsurface structure 230 (e.g., sand, salt, lime, vulcanic, etc.) in which the well was drilled, the oil and gas reservoir 232 presence next to the well 200, etc. This lack of a priori information requires to use of a high value calibration for the memory gauge in order to be able to record any value that is encountered inside the well.

Note that the slick-line option illustrated in FIG. 2 (i.e., a gauge connected to a line that extends to the surface) for lowering the gauge 100 in the well and putting it into position is only exemplary: other way for implementing a gauge in a well are possible and known, like a carrier coupled (e.g., screwed) to a string, or a suspending support helping the gauge to be positioned.

Thus, there is a need for an apparatus and method that more accurately estimate a measured value of a memory gauge.

SUMMARY

In one embodiment, there is a method for processing recorded raw data acquired with a memory gauge in a well. The memory gauge has plural calibration tables for a parameter to be measured with the gauge from the recorded raw data. The method includes selecting a first calibration table ($C_1$), of the memory gauge, that has a highest calibration value for the measured parameter; performing a first analysis of the recorded raw data using the first calibration table ($C_1$) to determine a highest measured value of the measured parameter; comparing the highest measured value of the measured parameter with highest calibration values of the plural calibration tables of the memory gauge; and (1) when a highest calibration value of a second calibration table is closer to the highest measured value of the measured parameter than the highest calibration value of the first calibration table, selecting the second calibration table ($C_2$), and performing a second analysis of the recorded raw data using the second calibration table ($C_2$) to generate measured values of the measured parameter; or (2) when the highest calibration value of the first calibration table is closer to the highest measured value of the measured parameter than a highest calibration value of the second calibration table, outputting a result of the first analysis.

In another embodiment, there is a device for processing recorded raw data acquired with a memory gauge in a well. The memory gauge has plural calibration tables associated with a parameter to be measured with the gauge from the recorded raw data. The device includes an interface for receiving the recorded raw data; and a processor. The processor is configured to select a first calibration table ($C_1$) of the memory gauge that has a highest calibration value for the measured parameter; perform a first analysis of the recorded raw data using the first calibration table ($C_1$) to determine a highest measured value of the measured parameter; compare the highest measured value of the measured parameter with highest calibration values of the plural calibration tables of the memory gauge; and (1) when a highest calibration value of a second calibration table is closer to the highest measured value of the measured parameter than the highest calibration value of the first calibration table, selecting the second calibration table ($C_2$), and perform a second analysis of the recorded raw data using the second calibration table ($C_2$) to generate measured values of the measured parameter; or (2) when the highest calibration value of the first calibration table is closer to the highest measured value of the measured parameter than a highest calibration value of the second calibration table, output a result of the first analysis.

In still another embodiment, there is a method for calibrating a memory gauge to be used in a well. The method includes placing the memory gauge in a chamber; varying, in a controlled way, a first parameter inside the chamber, up to a first maximum value; measuring with a sensor located on the memory gauge a second parameter; generating a first calibration table for the sensor for the first and second parameters while varying the first parameter up to the first maximum value; varying again the first parameter inside the chamber, up to a second maximum value, which is different from the first maximum value; measuring with the sensor located on the memory gauge the second parameter; generating a second calibration table for the sensor for the first and second parameters while varying the first parameter up to the second maximum value; and storing the first and second calibration tables in a memory associated with the memory gauge.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, an apparatus and method for measuring a pressure in a well with a memory gauge is discussed. However, the invention is not limited to measuring a pressure with a memory gauge in a well, but it may be applied to other situations, as for example, using any measuring device or tool in a medium in which the measuring range for a given parameter is large and a maximum value of the given parameter to be measured with the measuring device varies based on the medium, e.g., ESP (Electric Submersible Pump) gauges or PCP (Progressive Cavity Pump) gauges or any permanent gauges. Those skilled in the art would recognize other applications of the embodiments discussed herein.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The accuracy of a memory gauge is a percentage of the full scale of the gauge. Usually, the quartz gauges are rated with an accuracy of 0.02% of their full scale. The accuracy of piezo memory gauges usually is claimed as about 0.03 or 0.05% of their full scale. This means that the accuracy of a quartz memory gauge calibrated up to 1000 bars is 200 mbars whereas the accuracy of a piezo memory gauge calibrated up to 700 bars is 140 mbars.

This application refers to a memory gauge. A memory gauge is understood in the following to be a device that can measure at least one parameter, e.g., temperature or pressure or both. The measurements are stored in a memory associated with the memory gauge. In one application, the memory is located inside the gauge device, as illustrated in FIG. 1. However, in another application, the memory is not physically located on the gauge. For example, the memory may be located at earth surface, and connected via a communication link (wired or wireless) to the gauge tool located on in the well. FIG. 2 shows gauge 100 being connected through link 235 to a computing device 242, which includes memory 240. In this case, memory 240 is not located on the gauge, but is linked through link 235 to the gauge. As noted above, link 235 may be wireless. Thus, in the following, reference to a "memory gauge" implies that a memory is associated with the link, the memory is (1) located on or inside the gauge or (2) only connected to the gauge, but not physically located on or inside the gauge.

If a traditional memory gauge is used in a well for measuring pressures, and its calibration has been performed with a maximum value of 1000 bars, if the maximum pressure measured inside the well is only 500 bars, it means that the accuracy of the measurement is about 200 mbars, instead of potentially being 100 mbars because the 0.02% accuracy of 1,000 bars has been used instead of the 0.02% accuracy of the 500 bars. This problem is present for any memory gauge that is used in an environment in which it is not known the maximum value of the parameter to be measured. This inability to use the appropriate calibration for a given memory gauge can be solved as now discussed.

According to an embodiment, instead of performing a single calibration for a given memory gauge, plural calibrations are performed for the given memory gauge. For example, for a pressure memory gauge, instead of performing a single calibration with a maximum value of 1000 bars, two or more calibrations may be performed, each calibration having a maximum value $p_i$ with $p_i$ being different from $p_j$ for any two calibrations "i" and "j". Note that "i" is an index describing the calibration number and this index may have a value between 2 and 100. For simplicity, in the following, it is assumed that only two calibrations are performed for the given pressure memory gauge and $p_1$ is 1000 bars and $p_2$ is 500 bars.

Figure 3:
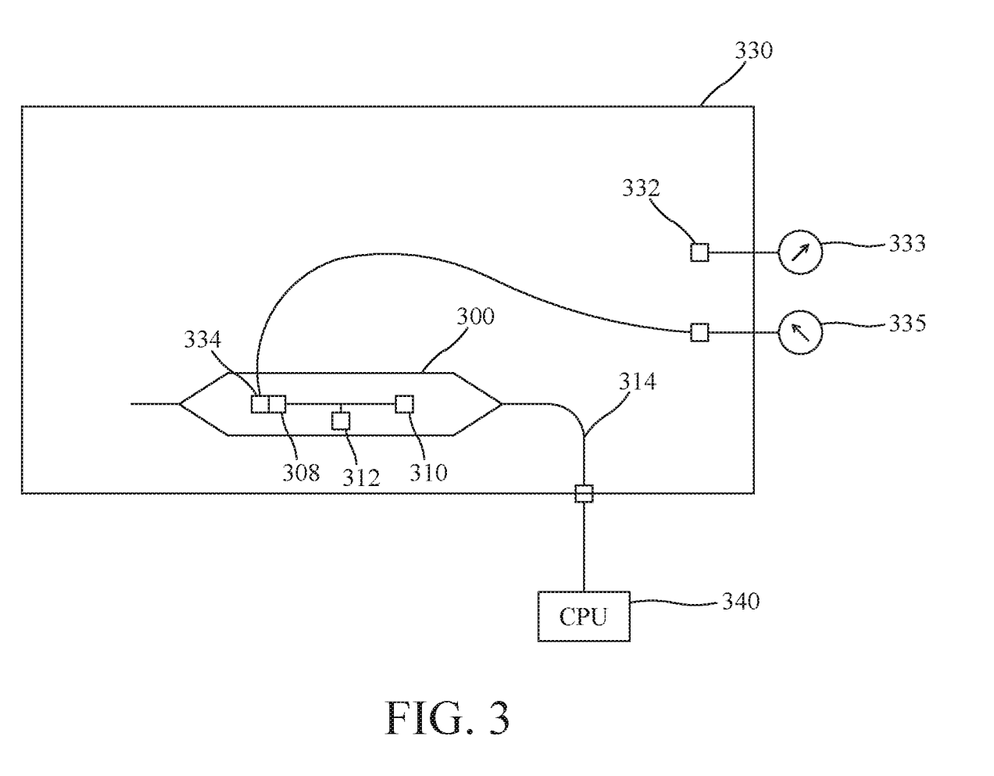
FIG. 3 illustrates a memory gauge located in a controlled environment for calibration.

Calibrating a sensor, a pressure sensor 308 in this case (any known pressure sensor may be used for the memory gauge 300), implies measuring in a controlled environment (e.g., in a calibrating chamber or oven 330 in the lab) a pressure with the pressure sensor 308 while the temperature inside the chamber 330 is varied incrementally (in a controlled way), based on a known schedule of temperature. A pressure actuator 334 may be located directly on the pressure sensor 308 (e.g., at the nose of the memory gauge) for generating a pressure directly on the pressure sensor. This means, that a pressure on the pressure sensor and an ambient temperature of the memory gauge are well known (measured with pressure sensor 308 and temperature sensor 332 and shown on respective dials 335 and 333) and the measurements acquired with the pressure sensor 308, which are stored in the memory gauge 300, are documented (for example, in a table) relative to the known applied pressures and/or generated temperatures in the controlled environment. In another embodiment, chamber 330 may be an oil bath in which the pressure sensor 308 is placed and the ambient temperature of the pressure sensor is controlled by controlling the temperature of the oil bath. Other calibration methods may be used as known in the art.

For this specific case, in which only two calibrations are performed for a pressure memory gauge 300, the associated calibration tables $C_1$ and $C_2$ are generated and stored in the memory 310 of the memory gauge 300. A processor 312 may be connected to sensor 308 and memory 310 for receiving the data from the sensor and writing the corresponding values in the memory 310. Processor 312 may also format this data to appear as calibration tables $C_1$ and $C_2$.

Alternatively, or in addition, a processor 340 associated with the controlled environment 330 may be electrically connected to memory gauge 300 for processing the data recorded by sensor 308, for generating the calibration tables $C_1$ and $C_2$, and/or for writing these tables into memory 310.

The step of writing the plural calibration tables (at least two) into the memory located in the memory gauge is preferred because any two memory gauges, even if manufactured to have the same characteristics, would have different properties, and thus, different calibration matrices. This means, that an external device (e.g., laptop) that is used at the well to read the recorded data from the memory gauge would also need to read the calibration tables from that memory gauge in order to accurately determine the accuracy of the readings. While it is possible to have generic calibration tables for all memory gauges that were manufactured to have the same characteristics, because of the inherent differences between the various memory gauges, it is more accurate to have specific calibration tables for each memory gauge. In addition, it is not possible to reach the 0.02% accuracy of the full scale with a generic calibration matrix.

Figure 4:
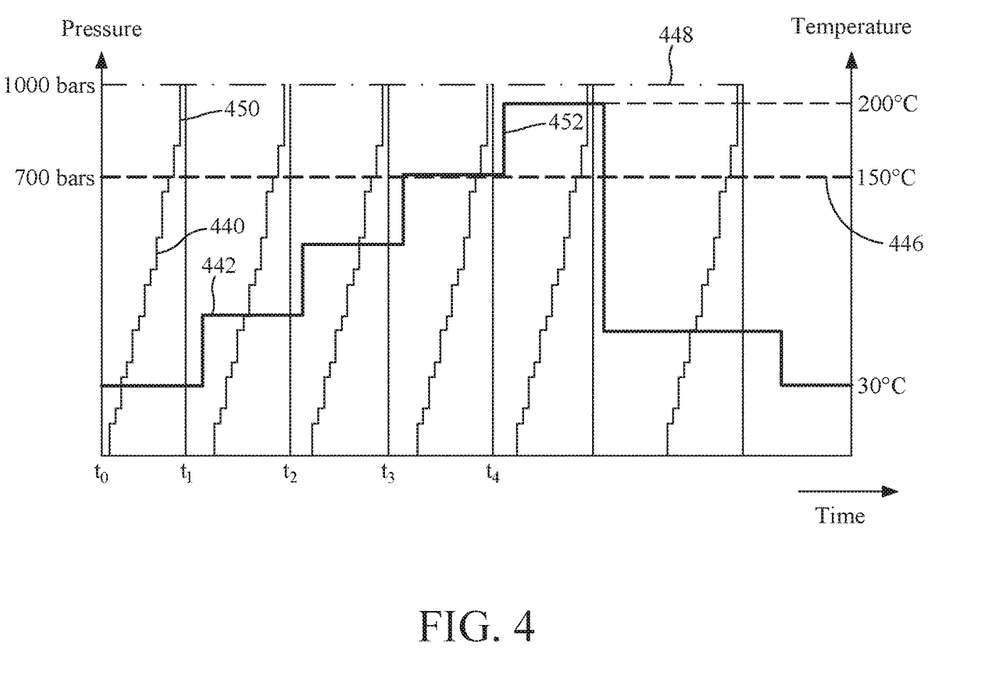
FIG. 4 illustrates calibration data obtained during the calibration process.

An example of calibrating the memory gauge 300 with two different calibration ranges is now discussed. FIG. 4 shows a first calibration 446 of the memory gauge 300 for a maximum temperature of 150° C. and a maximum pressure of 700 bars. The pressure profile 440 and the temperature profile 442 for the first calibration 446 are shown superimposed on the corresponding pressure profile 450 and temperature profile 452 of a second calibration 448. The abscissa indicates the time over which the calibration has taken place, with the time interval $t_0$ to $t_1$ indicating a constant temperature of about 30° C., $t_1$ to $t_2$ a higher temperature, and so on. The ordinate indicates on the left the pressure and on the right the temperature. One skilled in the art would understand that while the temperatures are kept constant at various values over different time intervals $t_i$ to $t_{i+1}$ inside the controlled environment 330, the pressure applied by the pressure actuator to the nose of the gauge, e.g., with a dead well tester (DWT) (preferably being $5 \times 10^{-4}$ accurate, pressure generator), is increased and recorded with the pressure sensor 308.

The data recorded in the memory 310 of the memory gauge 300 includes the information shown in FIG. 4, which is stored as a first calibrating table $C_1$ for the first range of pressures and temperatures and as a second calibrating table $C_2$ for the second range of pressures and temperatures. As discussed above, many calibrating tables may be stored in the memory of a single memory gauge. If the memory gauge includes plural sensors, e.g., one for pressure, one for temperature and one for the flow of a fluid inside the well, plural calibration tables for each parameter may be generated and stored in the memory for each sensor.

Figure 5:
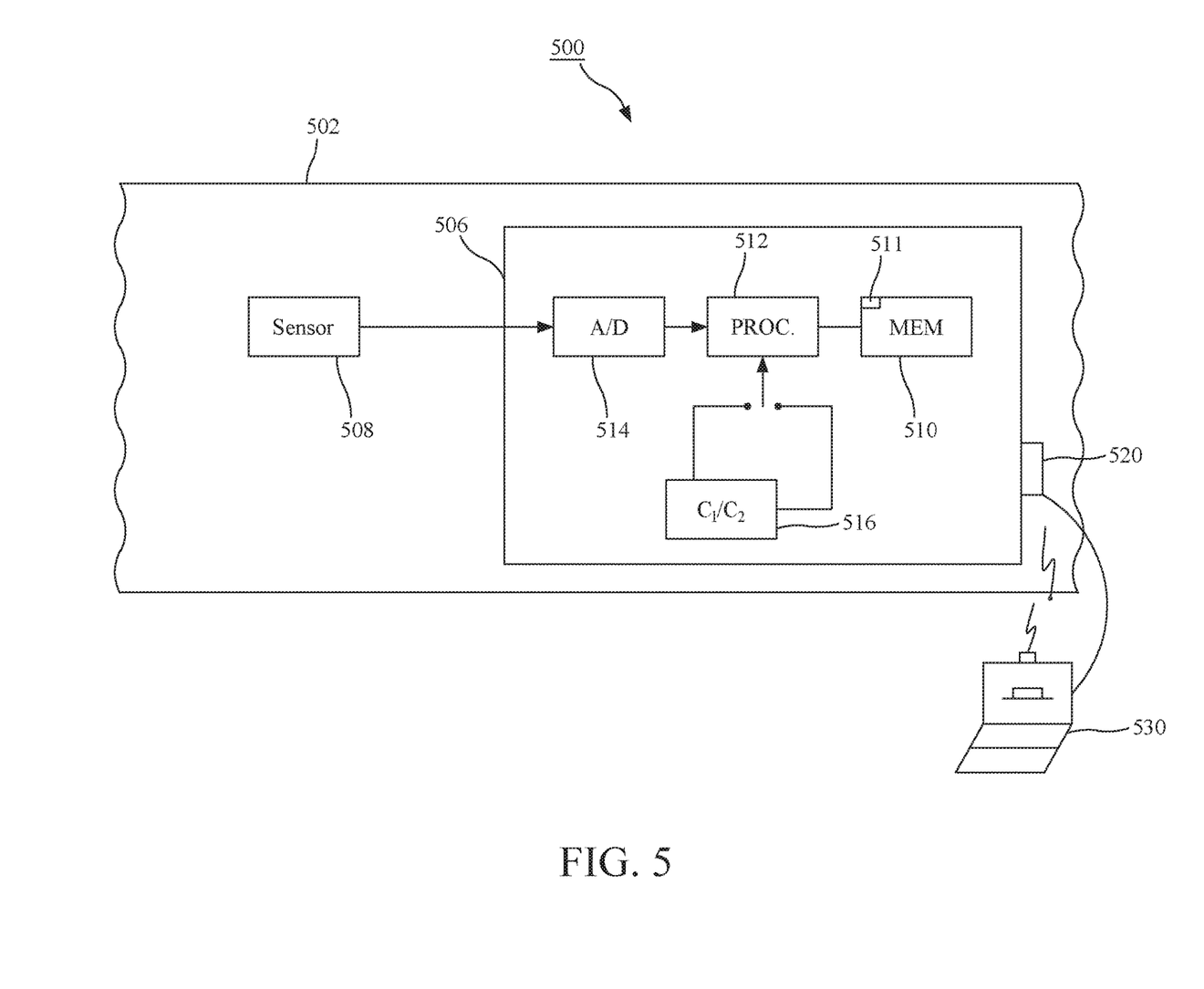
FIG. 5 illustrates a memory gauge having a sensor and a processing device.

FIG. 3 has illustrated one configuration of a memory gauge that can store plural calibration tables per sensor. FIG. 5 illustrates a different configuration of a memory gauge specifically built to store the calibration tables. Memory gauge 500 includes a body 502, which is made of metal to resist the high temperatures and pressures inside the well. A sensor 508 (e.g., pressure or temperature or any other type of sensor) is placed inside the body, outside the body or at the interface between the body and the environment. Sensor 508 is connected to a processing device 506 that is housed by body 502. Processing device 506 may include an analog to digital (A/D) converter 514, which transforms the analog measurement of the sensor into digital data. If the sensor is digital, the A/D converter may be omitted or programmed to not affect the digital signal. An output from the A/D converter is fed to processor 512. Processor 512 is also connected to a memory 510 that is configured to store the signals recorded by the sensor 508. These signals are the recorded raw data 511 recorded by the sensor. A calibration module 516, which may be implemented in software in processor 512 or as a dedicated circuitry as shown in FIG. 5, may store the calibration matrices $C_i$, and provide them upon request, to processor 512. Calibration module 516 acts like a switch that selects one of the existing calibration matrices, e.g., $C_1$ or $C_2$ when only two matrices are present.

In this application, the memory gauge 500 is not able to exchange data with a surface device while collecting data in the well because there is no telemetry between the memory gauge and the surface when the memory gauge is located in the well. However, in another application, as illustrated in FIG. 2, a link may be extending between the memory gauge 100 and the surface, and this link may transmit the recorded data from the gauge to the surface memory if no memory is provided on or inside the gauge. This link may also be used for deploying/retrieving the memory gauge inside the well. All recorded data 511 in the embodiment illustrated in FIG. 5 is stored in memory 510. When the acquisition is completed, the memory gauge is brought to the surface and made to communicate, via communication interface 520, with an external device 530, e.g., a computer, tablet, smartphone, etc. Memory gauge 500 may be left in the well, hanging from a deploying device, e.g., wire as illustrated in FIG. 2, during data collection so that the data is continuously or intermittently transmitted from the gauge to the surface as the survey progresses. Alternatively, after the memory gauge has been deployed, the deploying tool is removed and the memory gauge uses a wing to be fixedly attached to the well. After all the data has been collected, the deploying tool is deployed again in the well for retrieving the memory gauge. Communication interface 520 may be a wireless interface that uses existing communication methods, as, for example, Bluetooth, wi-fi, radio communication, etc., or may be a wired interface that connects through a cable (e.g., coaxial, Ethernet, etc.) directly to the surface computer 530 for communicating the recorded data.

Irrespective of which type of communication is adopted, after the external device 530 has retrieved the stored raw data from memory 510 and the plural calibration tables from calibration unit 516 or memory 510, the external device selects the maximum range calibration matrix (if pressure is measured, then the external device selects a first calibration matrix for the highest-pressure value) and runs a first analysis of the recorded data 511 with this calibration table. The first analysis produces the recorded pressures and the highest measured pressure $P_{high}$ is identified. Based on this highest measured pressure $P_{high}$, the external device 530 may select a second calibration table that has its highest calibration pressure $P_{calibration}$ closest to the measured highest pressure $P_{high}$. In one application, the first calibration table is identical to the second calibration table, in which case, the optimal accuracy was obtained, and the recorded pressures are considered as being the measured pressure data. In another embodiment, the two calibration tables are different and the accuracy in the recorded pressures can be improved by using the second calibration table, which has the highest calibration pressure closer to the higher measured pressure than the first calibration table.

For example, consider that in one embodiment two calibration tables $C_1$ and $C_2$ (or matrixes) were embedded into the memory gauge's calibration unit 516. The first calibration table $C_1$ has a maximum pressure of 1000 bars and the second calibration table $C_2$ has a maximum pressure of 2000 bars. The memory gauge is used in a well job in which the measured pressure does not exceed 500 bars. The first analysis of the recorded data uses the calibration table $C_2$ having the highest calibration pressure $P_{calibration}$, i.e., 2000 bars. After determining during the first analysis in the external device 530 that the highest recorded pressure $P_{high}$ is about 500 bars, the external device selects the other calibration table $C_1$ (highest pressure 1000 bars) for the second analysis of the recorded data 511. The data 511 recorded during that particular well job is then accurate within 200 mbars instead of 400 mbars as a traditional memory gauge would have delivered.

Figure 6:
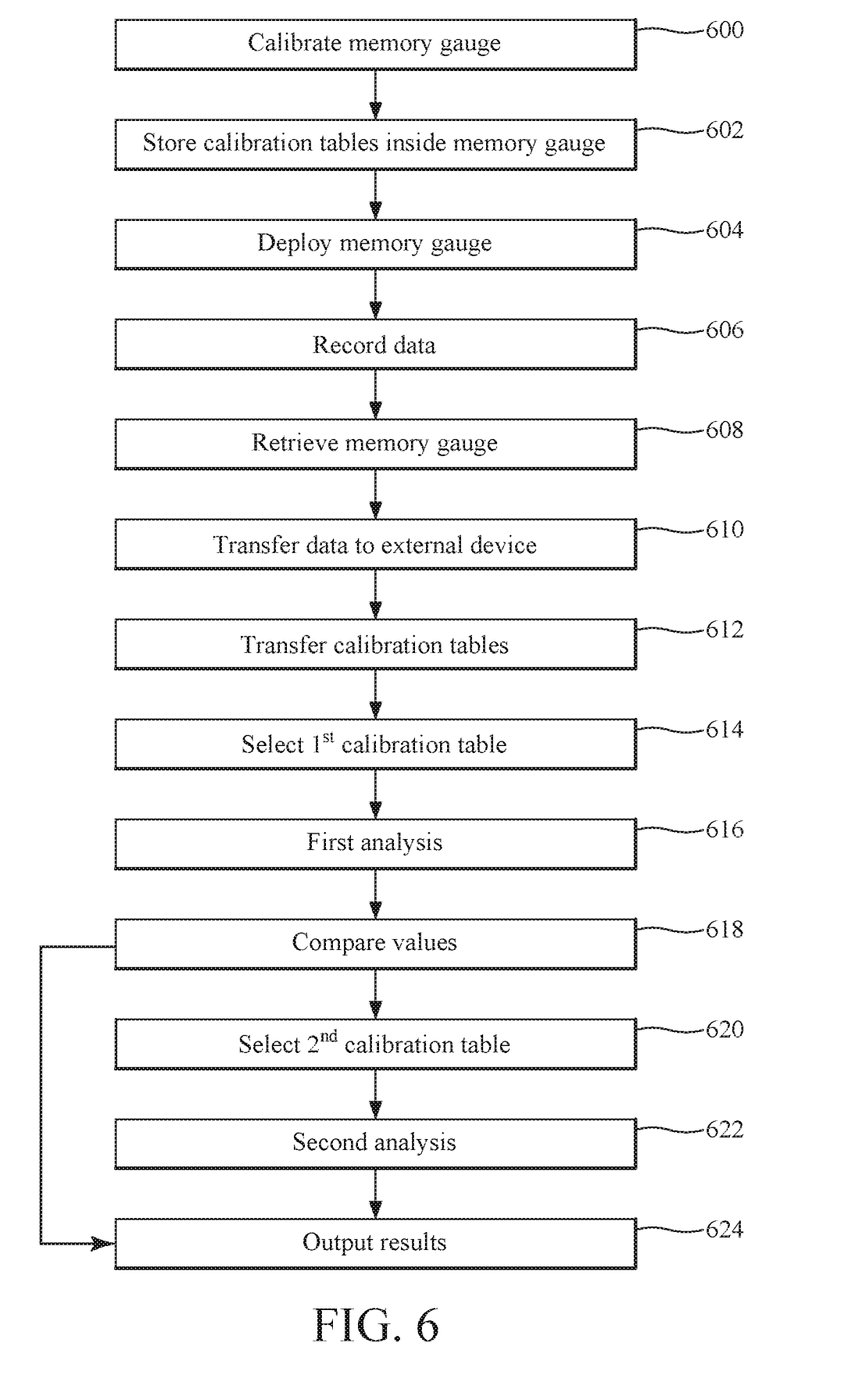
FIG. 6 is a flowchart of a method for measuring raw data and processing it with different calibrations.

A method for processing recorded data 511 according to this novel process is now discussed with regard to FIG. 6. FIG. 6 shows a step 600 of calibrating a given memory gauge 500 for at least two different calibration ranges. The first calibration range generates a first calibration table $C_1$ and the second calibration range generates a second calibration table $C_2$. The calibration ranges may be for pressure, temperature, flow, or other parameters measured within a well with a memory gauge. The calibration of the memory gauge is performed inside a controlled environment as discussed above with respect to FIG. 3. The calibration tables may include the information illustrated, for example, in FIG. 4.

In step 602, the generated calibration tables are stored within the memory gauge, for example, in a dedicated memory 510. The step may be applied to existing memory gauges which have a memory or to new memory gauges that have a calibration module 516, as illustrated in FIG. 5. In step 604, the memory gauge is deployed within a well for acquiring data. The preferred memory gauge typically does not have electrical communication with the surface (i.e., no telemetry). In step 606, the memory gauge records the raw data 511 (pressure or temperature or flow or a combination thereof) and stores this data in the memory 510. The data may be stored as analog data or digital data. The raw data recorded by the sensor may be stored as is or it may be slightly processed at the processor 512, prior to being stored in memory 510. This slight processing may include, for example, transforming the analog data into digital data.

In step 608, after the recording has been finished, the memory gauge is retrieved from the well and connected to the external device 530 at the surface as illustrated in FIG. 5. In step 610, the recorded data 511 is retrieved from the memory 508 of the memory gauge and stored into the external device. In step 612, the calibration tables $C_1$ from the memory gauge are transferred to the external device. In step 614, the calibration table having the largest calibration parameter (e.g., pressure $P_{calibration}$ if the sensor is a pressure sensor) is selected. In step 616, a first analysis of the recorded data 511 is performed using the calibration table selected in step 614. A result of this analysis outputs the highest value of the measured parameter (e.g., $P_{high}$) with an uncertain accuracy. In step 618, the highest value of the measured parameter, calculated based on the calibration table selected in step 614, is compared with the highest calibration pressure of the same calibration table. Based on this comparison, if the highest calibration pressure of another calibration table is closer to the highest value of the measured parameter than the highest calibration pressure of the calibration table selected in step 614, then the method advances to step 620, in which the method selects another calibration table having its highest calibration value as close as possible to the highest measured value determined in step 616. Otherwise, the method outputs the results of the first analysis in step 624 and stops. For example, if there are three calibration tables having the highest calibration value 500, 1000 and 1500, respectively, and the highest measured value obtained during the first analysis is 1300, then the third calibration table having the highest calibration value 1500 is selected as 1500 is closer to measured value 1300 than highest calibration value 1000 of the second calibration table.

Having selected the most appropriate calibration table, the external device performs a second analysis in step 622 (considering that the first calibration table selected in step 614 was not the best), in which the highest measured value and the other measured values are determined with the best accuracy based on the selected calibration table. Step 622 might be omitted if the originally chosen calibration table is identical to the most appropriate calibration table, as discussed above.

In step 624, the external device outputs all the measured values in a visual form, for example, as a printout or as a file or as an image on a screen.

In one application, the calculations performed in the external device may be partially or totally performed in the processor of the memory gauge. For example, if the memory gauge has a powerful processor and a good power source, the first analysis step may be performed in the memory gauge and the second analysis step may be performed in the external device. In still another embodiment, if the memory gauge's processor is powerful enough, both the first and second analysis steps are performed in the memory gauge. If this is the case, the processing may start while the memory gauge is in the well.

In an alternative embodiment, the span of the measured data (e.g., its range) may be determined and divided into various intervals and a best calibration table is selected for each interval. Then, the second analysis step uses the best calibration table for each interval and at the end, the measured data processed as a result of the second analysis step is put together to form a single set of data. Continuity problems that may appear at the borders of the selected intervals may be addressed by applying various tappers or known mathematical methods.

Figure 7:
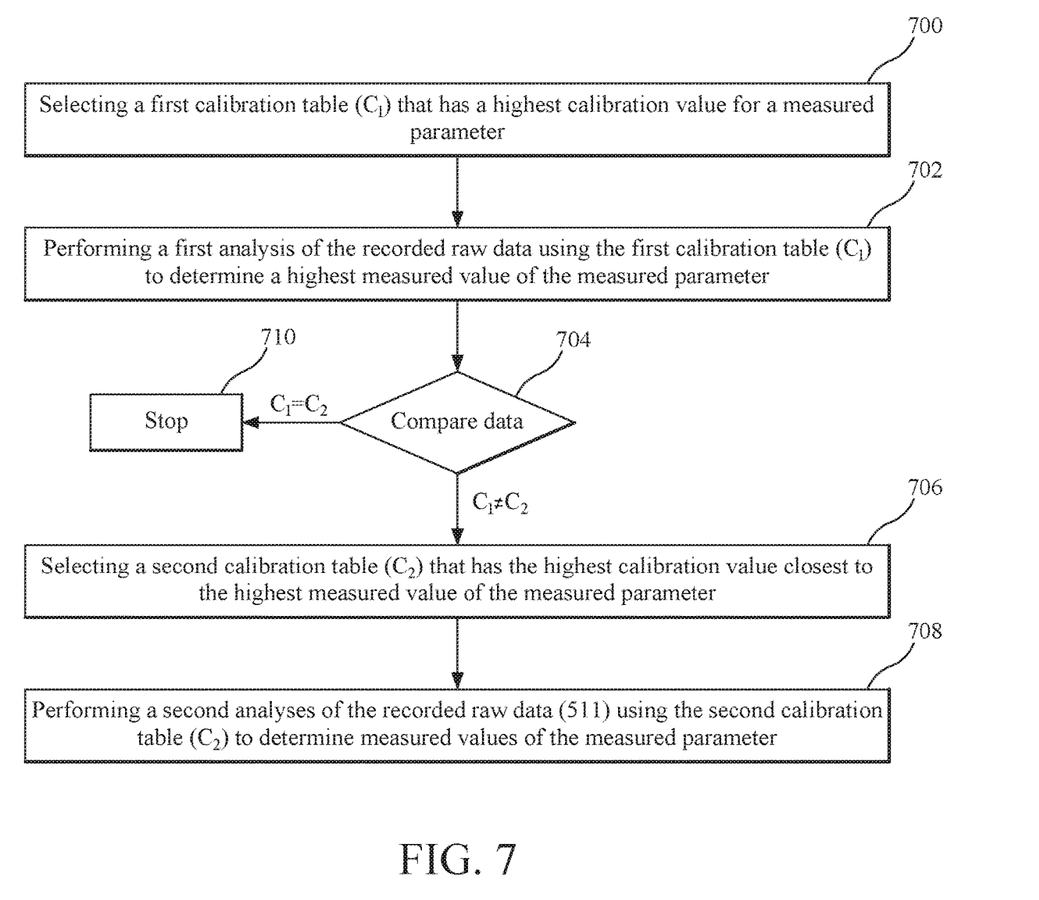
FIG. 7 is a flowchart of a method for calibrating a memory gauge with different calibration ranges.

A method for processing recorded raw data acquired with a memory gauge in a well is now discussed with regard to FIG. 7. The method includes a step 700 of selecting a first calibration table ($C_1$) that has a highest calibration value for a measured parameter, a step 702 of performing a first analysis of the recorded raw data using the first calibration table ($C_1$) to determine a highest measured value of the measured parameter, and a step 704 of comparing the highest measured value of the measured parameter with the calibration values of the first and second calibration tables. If the highest measured value of the measured parameter is closer to the calibration values of the second calibration table, then the method advances to step 706 of selecting a second calibration table ($C_2$) that has the highest calibration value closest to the highest measured value of the measured parameter, and a step 708 of performing a second analysis of the recorded raw data using the second calibration table ($C_2$) to determine measured values of the measured parameter. If the highest measured value of the measured parameter is closer to the calibration values of the first calibration table, then the method proceeds from step 704 to step 710, in which it outputs the measured data processed with the first calibration table.

Figure 8:
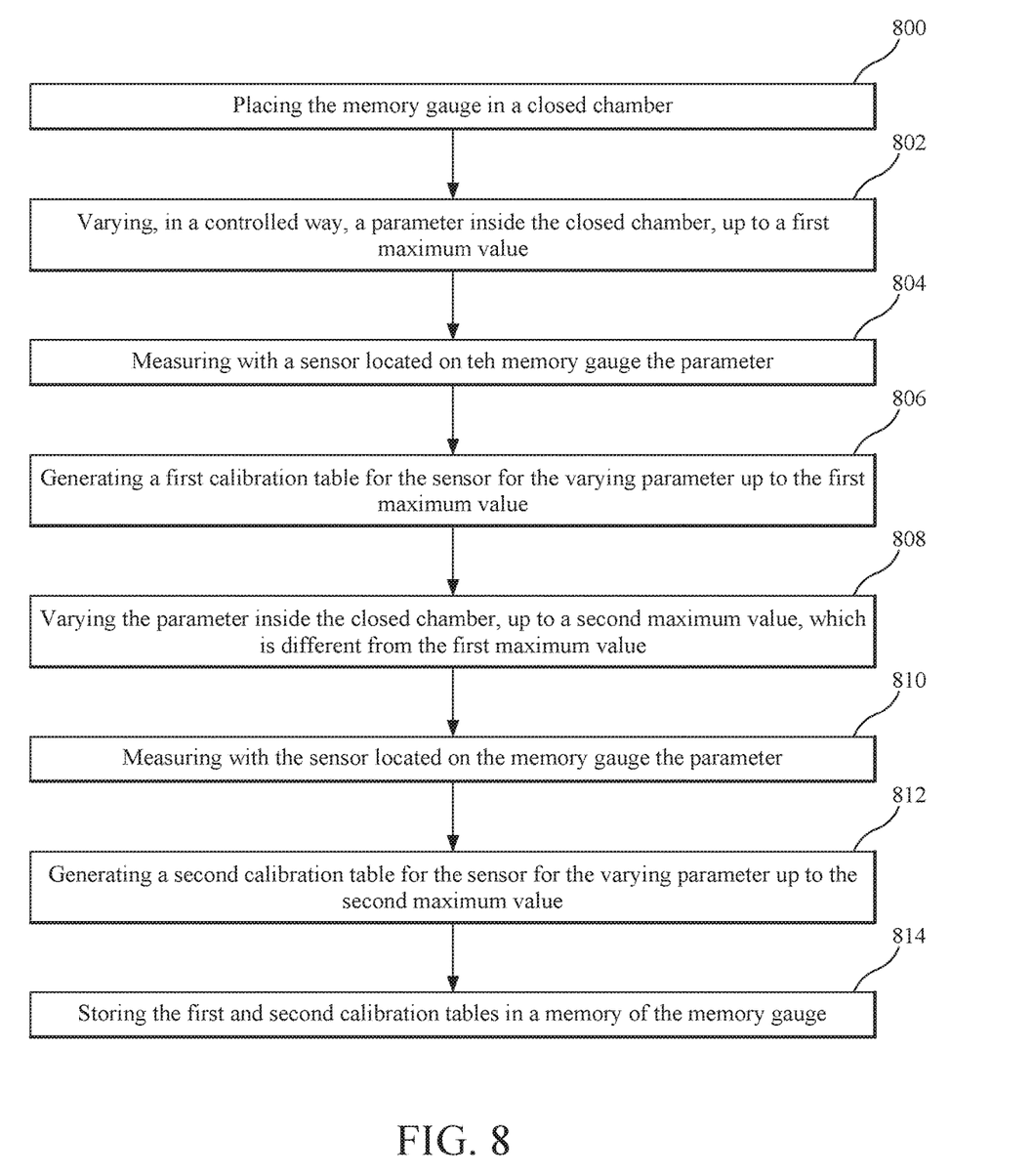
FIG. 8 is a flowchart of a method for processing recorded raw data with an adaptive calibration.

A method for calibrating a memory gauge to be used in a well is now discussed with regard to FIG. 8. The method includes a step 800 of placing the memory gauge in a chamber, usually an oven or an oil bath, a step 802 of varying, in a controlled way, a first parameter (e.g., temperature) inside the chamber, up to a first maximum value, a step 804 of measuring with a sensor of the memory gauge a second parameter (e.g., pressure) while the first parameter is varied, a step 806 of generating a first calibration table for the sensor for the first and second parameters, with the first parameter varying up to the first maximum value, a step 808 of varying the first parameter inside the chamber, up to a second maximum value, which is different from the first maximum value, a step 810 of measuring with the sensor located on the memory gauge the second parameter, a step 812 of generating a second calibration table for the sensor for the first and second parameters, with the first parameter varying up to the second maximum value, and a step 814 of storing the first and second calibration tables in a memory of the memory gauge.

Figure 9:
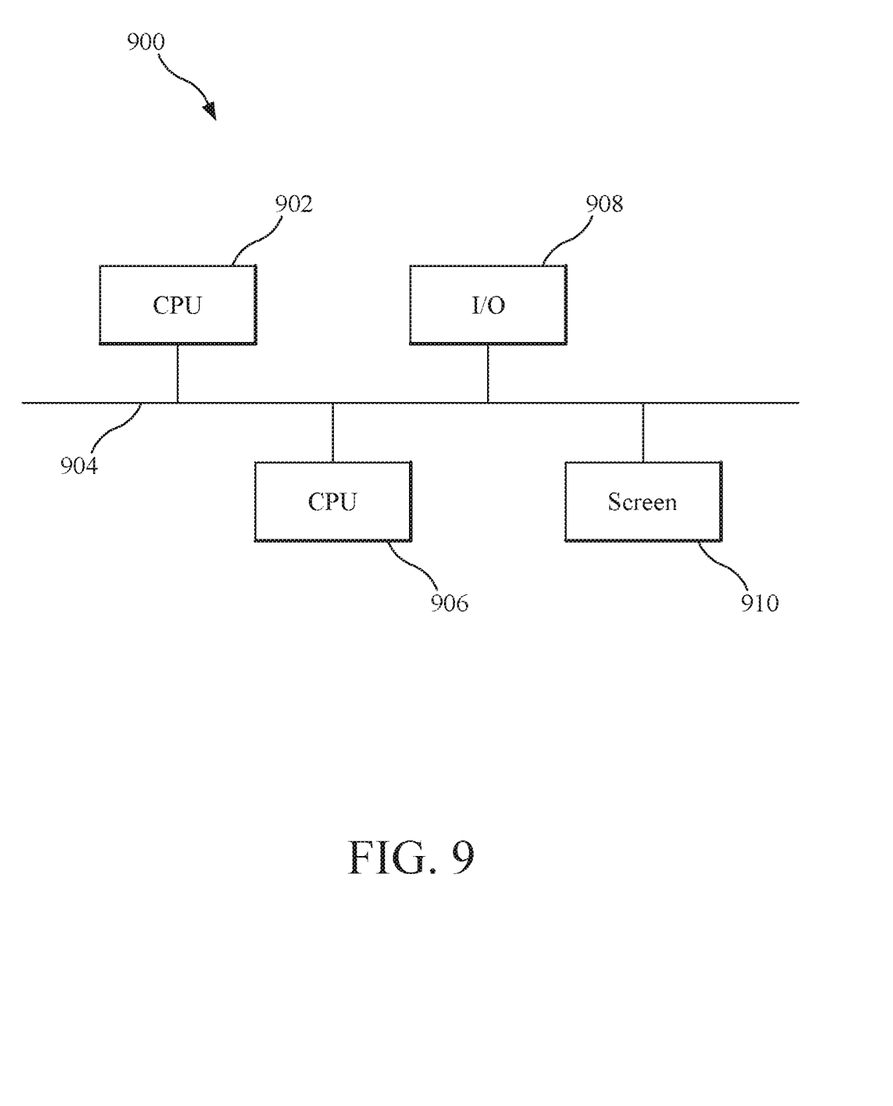
FIG. 9 is a schematic illustration of a computing device for implementing one or more of the methods discussed herein.

An exemplary computing device that can run the methods discussed above is illustrated in FIG. 9. The computing device 900 includes a processor 902 that is connected through a bus 904 to a storage device 906. Computing device 900 may also include an input/output interface 908 through which data can be exchanged with the processor and/or storage device. For example, a keyboard, mouse or other device may be connected to the input/output interface 908 to send commands to the processor and/or to collect data stored in storage device or to provide data necessary to the processor. Results of this or another algorithm may be visualized on a screen 910.

The disclosed exemplary embodiments provide an apparatus and method for better processing raw data recorded inside a well. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for optimally processing recorded raw data acquired with a memory gauge in a well, wherein the memory gauge has plural calibration tables for a parameter to be measured with the gauge from the recorded raw data, the method comprising:
    selecting a first calibration table ($C_1$), of the memory gauge, that has a highest calibration value for the measured parameter;
    performing a first analysis of the recorded raw data using the first calibration table ($C_1$) to generate measured values of the measured parameter and to determine a highest measured value of the measured parameter;
    comparing the highest measured value of the measured parameter with highest calibration values of the plural calibration tables of the memory gauge;
    if the comparing yields that a highest calibration value of a second calibration table is closer to the highest measured value of the measured parameter than the highest calibration value of the first calibration table, selecting the second calibration table ($C_2$), and performing a second analysis of the recorded raw data using the second calibration table ($C_2$) to generate the measured values of the measured parameter; and
    outputting the measured values.

2. The method of claim 1, further comprising:
    storing the recorded raw data at a memory in the memory gauge;
    transferring the recorded raw data from the memory gauge to an external device; and
    transferring the plural calibration tables ($C_1$, $C_2$) from the memory gauge to the external device.

3. The method of claim 1, further comprising:
    storing the plural calibration tables in a memory associated with the memory gauge.

4. The method of claim 1, wherein the measured parameter is temperature.

5. The method of claim 1, wherein the measured parameter is pressure.

6. The method of claim 1, further comprising:
    recording the recorded raw data with a sensor located on the memory gauge.

7. The method of claim 1, wherein the step of selecting the first calibration table ($C_1$), the step of performing the first analysis of the recorded raw data, the step of comparing, the step of selecting the second calibration table ($C_2$), and the step of performing the second analysis of the recorded raw data take place in an external computer, after the measured raw data has been transferred from the memory gauge to the external computer.

8. The method of claim 1, wherein the step of selecting the first calibration table ($C_1$), the step of performing the first analysis of the recorded raw data, the step of comparing, the step of selecting the second calibration table ($C_2$), and the step of performing the second analysis of the recorded raw data take place in the memory gauge.

9. The method of claim 1, wherein the first calibration table is different from the second calibration table.

10. A device for optimally processing recorded raw data acquired with a memory gauge in a well, wherein the memory gauge has plural calibration tables associated with a parameter to be measured with the gauge from the recorded raw data, the device comprising:
an interface for receiving the recorded raw data; and
a processor configured to,
select a first calibration table ($C_1$) of the memory gauge that has a highest calibration value for the measured parameter;
perform a first analysis of the recorded raw data using the first calibration table ($C_1$) to generate measured values of the measured parameter and to determine a highest measured value of the measured parameter;
compare the highest measured value of the measured parameter with highest calibration values of the plural calibration tables of the memory gauge;
if a highest calibration value of a second calibration table is closer to the highest measured value of the measured parameter than the highest calibration value of the first calibration table, then select the second calibration table ($C_2$), and perform a second analysis of the recorded raw data using the second calibration table ($C_2$) to generate the measured values of the measured parameter; and
output the measured values.

11. The device of claim 10, wherein the processor is further configured to:
store the recorded raw data at a memory in the memory gauge;
transfer the recorded raw data from the memory gauge to an external device; and
transfer the plural calibration tables ($C_1$, $C_2$) from the memory gauge to the external device.

12. The device of claim 10, further comprising:
a memory for storing the plural calibration tables.

13. The device of claim 10, wherein the measured parameter is a temperature or a pressure.

14. The device of claim 10, further comprising:
a sensor for recording the recorded raw data.

* * * * *